(12) United States Patent
Zhu et al.

(10) Patent No.: US 9,354,137 B2
(45) Date of Patent: May 31, 2016

(54) SYSTEMS AND METHODS FOR DETERMINING OSCILLATIONS OF A TIRE

(71) Applicant: GM GLOBAL TECHNOLOGY OPERATIONS LLC, Detroit, MI (US)

(72) Inventors: Jinshuo Zhu, Novi, MI (US); Kenneth L. Oblizajek, Troy, MI (US); Christopher A. Stirlen, Milford, MI (US); John D. Sopoci, Commerce Township, MI (US); Zachary M. Shehabi, Battle Creek, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 90 days.

(21) Appl. No.: 14/166,356

(22) Filed: Jan. 28, 2014

(65) Prior Publication Data
US 2015/0211959 A1        Jul. 30, 2015

(51) Int. Cl.
*G01M 17/02*        (2006.01)
*G01M 7/02*         (2006.01)
*B60C 99/00*        (2006.01)

(52) U.S. Cl.
CPC ............... *G01M 7/02* (2013.01); *B60C 99/006* (2013.04); *G01M 17/02* (2013.01)

(58) Field of Classification Search
None
See application file for complete search history.

(56) References Cited

U.S. PATENT DOCUMENTS

| | | | |
|---|---|---|---|
| 5,894,086 A * | 4/1999 | Jao et al. | 73/146 |
| 8,024,965 B2 * | 9/2011 | Albohr et al. | 73/146.5 |
| 2004/0066287 A1 * | 4/2004 | Breed et al. | 340/442 |
| 2009/0314075 A1 * | 12/2009 | Albohr et al. | 73/146 |
| 2010/0186493 A1 * | 7/2010 | Brusarosco et al. | 73/146.3 |
| 2011/0074564 A1 * | 3/2011 | Hirabayashi et al. | 340/447 |
| 2012/0067481 A1 * | 3/2012 | Cron | 152/326 |

* cited by examiner

*Primary Examiner* — Andre Allen
(74) *Attorney, Agent, or Firm* — Ingrassia Fisher & Lorenz, P.C.

(57) ABSTRACT

Methods and systems are provided for determining frequencies associated with tire crown bending. The system includes a vibration generating device configured to excite vibrations through a tire. The system further includes a vibration sensing arrangement configured to sense vibrations at a plurality of sensing points on the tire. A computer is in communication with the vibration sensing arrangement and configured to determine a first frequency associated with bending of the crown of the tire based at least partially on phase differences between the sensed vibrations at the plurality of points on the tire.

18 Claims, 4 Drawing Sheets

SYSTEMS AND METHODS FOR DETERMINING OSCILLATIONS OF A TIRE

TECHNICAL FIELD

The technical field generally relates to determining vibrations of a tire, and more particularly relates to determining oscillations of a crown of a tire for a vehicle.

BACKGROUND

Interaction between tires and a road can cause undesired noise that is bothersome to operators and/or other occupants of a vehicle, such as an automobile. In one instance, vibrations of the tires occur, particularly when traversing coarse roads. Coarse roads typically include irregular and/or uneven surfaces. Such surfaces may be associated with, for example, concrete cracks, spalled surfaces, and/or damaged textured surfaces. Operation of a vehicle on such surfaces may result in unwanted passenger compartment noise.

Accordingly, it is desirable to provide a system and method for determining a condition which results in undesired noise when a vehicle is driven on coarse roads. In addition, it is desirable to provide a system and test to check tires that are susceptible to such undesired noises. Furthermore, other desirable features and characteristics of the present invention will become apparent from the subsequent detailed description and the appended claims, taken in conjunction with the accompanying drawings and the foregoing technical field and background.

SUMMARY

A system is provided for determining frequencies associated with tire crown bending. In one embodiment, the system includes a vibration generating device configured to excite vibrations through a tire. The system further includes a vibration sensing arrangement configured to sense vibrations at a plurality of sensing points on the tire. A computer is in communication with the vibration sensing arrangement and configured to determine a first frequency associated with bending of a crown of the tire based at least partially on phase differences between the sensed vibrations at the plurality of points on the tire.

A method is provided for determining frequencies associated with tire crown bending. In one embodiment, the method includes exciting vibrations through a tire and sensing vibrations at a plurality of points on the tire. The method also includes determining a first frequency associated with bending of a crown of the tire based at least partially on phase differences between the sensed vibrations at the plurality of points on the tire.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

Figure 1:
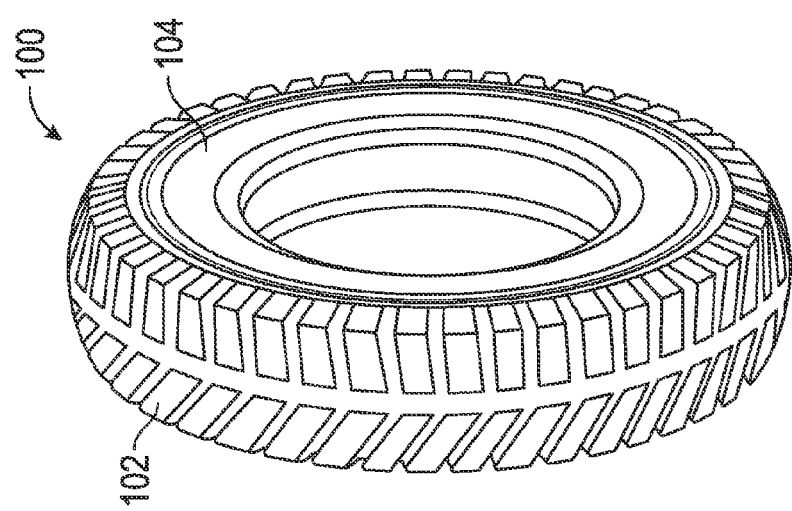
FIG. 1 is a perspective view of a tire in accordance with an embodiment.

Referring to FIG. 1, a tire 100 for a vehicle (not shown) includes a crown 102 and a pair of sidewalls 104. The crown 102 extends around a circumference (not numbered) of the tire 100 and engages the ground and/or road (not shown) when the tire 100 is mounted on the vehicle. The crown 102 typically includes a tread pattern (not numbered) as is well known to those skilled in the art. The sidewalls 104 extend generally perpendicular from each side of the crown 102 for connection of the tire 100 to a wheel (not shown).

Figure 2:
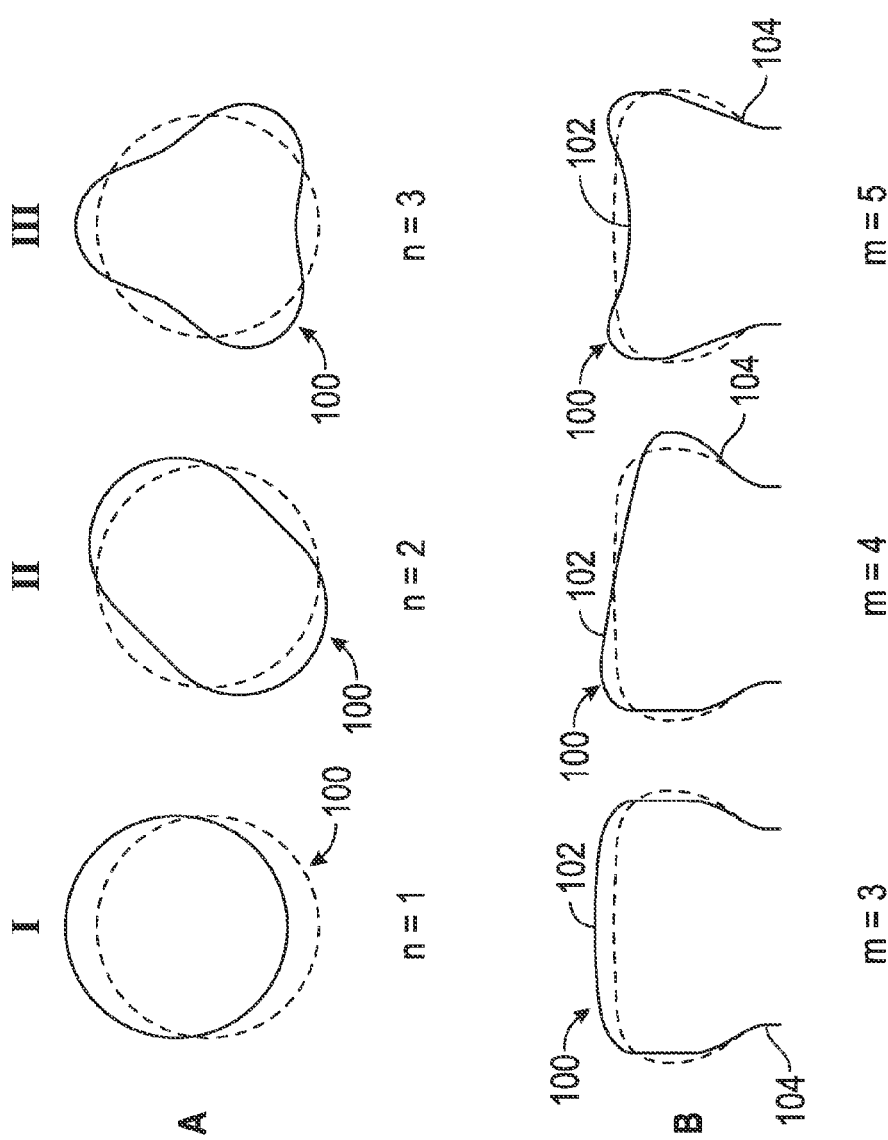
FIG. 2 illustrates modes of oscillation of the tire in accordance with an embodiment.

All references herein regarding tire vibratory shapes assume the tire 100 is mounted on a wheel and inflated. The tire 100, when mounted and inflated, may tend to deform, i.e., bend, in a repetitive manner. That is, the tire 100 may oscillate with disproportionately large amplitude at specific frequencies based on numerous factors, including, but not limited to, the specific design of the tire 100 (e.g., size, materials, tread pattern, etc.), the characteristics of the ground and/or road, and a speed of rotation of the tire 100. Selected modes of oscillation of the tire 100 are shown in FIG. 2. The dotted lines represent the tire 100 without oscillation while the solid lines represent the tire 100 oscillations. Row A of FIG. 2 generally illustrates a side view of the tire 100 along its circumference while Row B illustrates a cross-sectional view of the crown 102 and sidewalls 104 of the tire along its width. A-I of FIG. 2 illustrates a vertical bouncing of the tire 100, A-II illustrates a second bending of the tire 100, and A-III illustrates a crown 102 bending of the tire 100 for n=3 with six symmetrically located regions of locally maximal radial activity.

Of particular interest are the frequencies associated with crown bending. Research and development into tires has shown that some structural compositions of tires result in certain modes of crown bending in the range of 250-400 Hz, producing undesired noise in a passenger compartment (not shown) of the vehicle. This is particularly evident for vehicles with unibody construction. Thus, it is desired to determine at what frequency a particular tire will produce vibrations associated with significant crown bending oscillations. More particularly, it is desired to determine a first frequency at which the tire produces vibrations associated with crown bending oscillations. Therefore, with continued reference to the figures, a system 300 and method to determine frequencies associated with crown bending, in particular a first frequency associated with crown bending, is described below.

Figure 3:
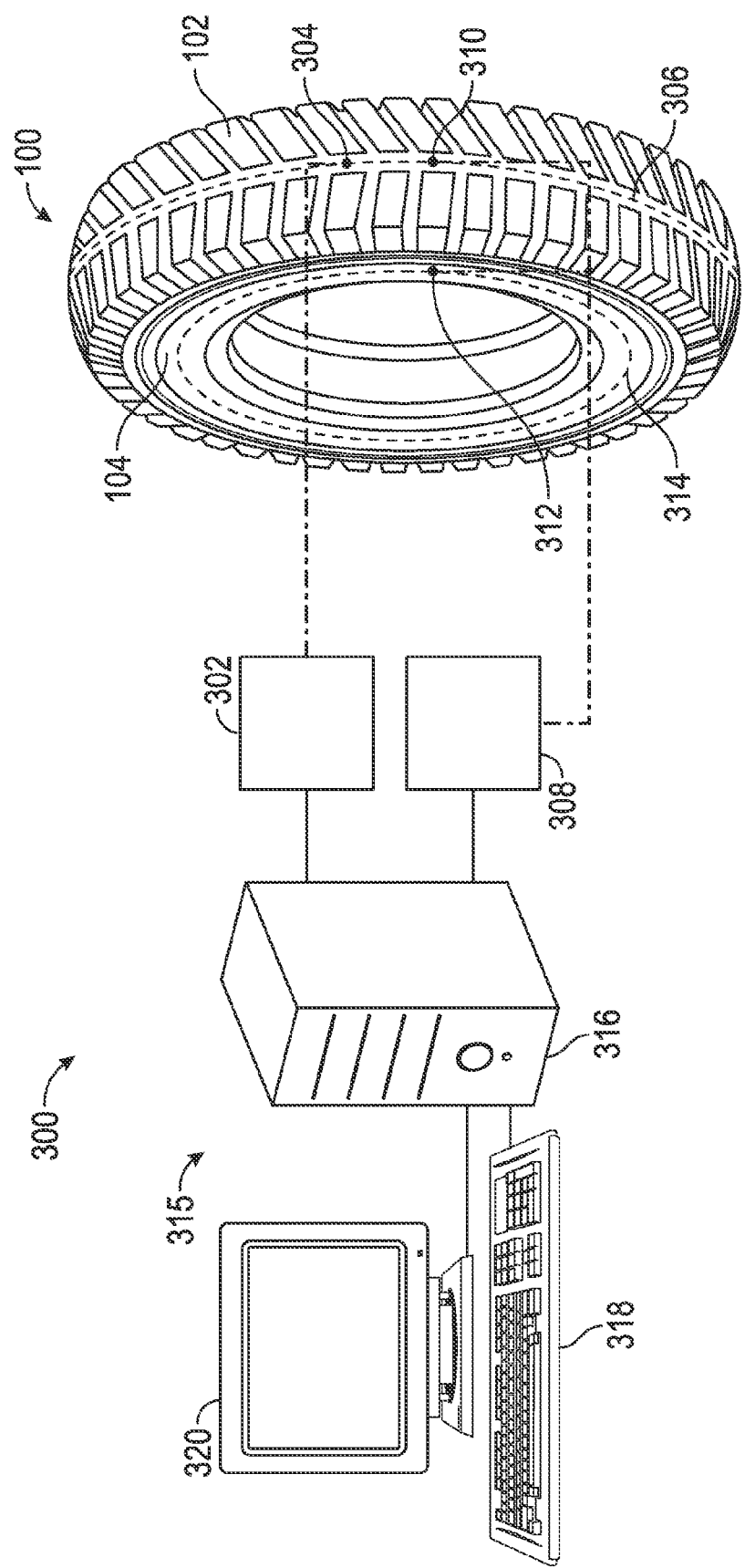
FIG. 3 is a block diagram of a system for determining frequencies associated with bending of a crown of the tire in accordance with an embodiment.

Referring to FIG. 3, the system 300 includes a vibration generating device 302. The vibration generating device 302 is configured to excite vibrations (i.e., oscillations) through the tire 100. That is, the vibration generating device 302 causes the tire 100 to vibrate. More particularly, in some embodiments, the vibration generating device 302 excites vibrations at a point 304 on the crown 102 of the tire. Even more particularly, in some embodiments, the point 304 is located generally at a center 306 of the crown 102. The center 306 of the crown 102 is defined by a line running around the circumference of the tire 100 and spaced equidistantly from the sidewalls 104. The term "generally", when used with respect to the point 304, indicates that the point 304 need not be disposed precisely on the halfway point of the crown 102. Instead, the point 304 may be disposed on either side of the center 306 ±25% of the total width of the crown 102.

Figure 4:
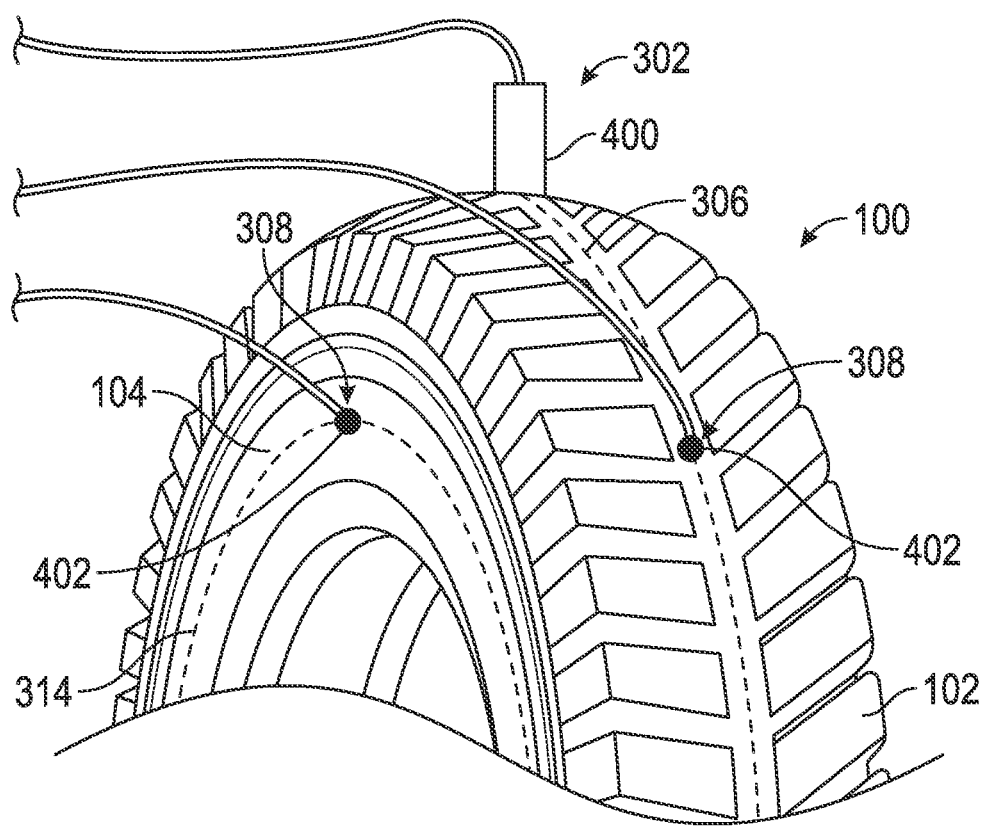
FIG. 4 is a perspective view of the tire showing an impact hammer and a plurality of accelerometers in accordance with an embodiment.

In some embodiments, such as that shown in FIG. 4, the vibration generating device 302 may be implemented with a hammer 400 that physically strikes the crown 102 of the tire 100. One suitable hammer 400 is the model AS-1220 automated impact hammer manufactured by Alta Solutions, Inc., headquartered in San Diego, Calif. Another suitable hammer is the model 086C03 manual impact hammer sold by PCB Piezotronics, Inc., headquartered in Depew, N.Y.

In other embodiments, the vibration generating device 302 is implemented with an electrodynamic shaker (not shown) to generate vibrations through the tire 100. One suitable electrodynamic shaker is the type 4810 device manufactured by Brüel & Kjer Sound & Vibration Measurement A/S, headquartered in Denmark. Of course, other suitable devices may be implemented as the vibration generation device 302, as is appreciated by those skilled in the art.

Referring again to FIG. 3, the system 300 also includes a vibration sensing arrangement 308. The vibration sensing arrangement 308 is configured to sense vibrations at a plurality of sensing points 310, 312 on the tire 100. In one exemplary embodiment, the plurality of sensing points 310, 312 include a first point 310 and a second point 312. The first point 310 is disposed on the crown 102 of the tire 100. More particularly, in some embodiments, the first point 310 is located generally at the center 306 of the crown 102. The term "generally", when used with respect to the first point 310, indicates that the first point 310 need not be disposed precisely on the halfway point of the crown 102. Instead, the first point 310 may be disposed on either side of the center 306 ±25% of the total width of the crown 102.

The second point 312 is disposed on one of the sidewalls 104 of the tire 100. More particularly, in some embodiments, the second point 312 is located generally at a center 314 of the sidewall 104. The term "generally", when used with respect to the second point 312, indicates that the second point 312 need not be disposed precisely on the halfway point of the sidewall 104. Instead, the second point 312 may be disposed on either side of the center 314 ±25% of the total width of the sidewall 104.

In other exemplary embodiments, other sensing points (not shown) may be utilized to sense vibrations on the tire 100, in addition to the first and second points 310, 312. Such additional sensing points may be utilized to increase the accuracy of the first frequency, as described further below.

In one exemplary embodiment, the vibration sensing arrangement 308 is implemented with a plurality of accelerometers 402, as shown in FIG. 4. One suitable accelerometer 402 is model A356A15 manufactured by PCB Piezotronics, Inc. In another exemplary embodiment, the vibration sensing arrangement 308 is implemented with a spindle force transducer and signal conditioner, model numbers Z16460 and 5060A12100, manufactured by Kistler Instrumente AG, headquartered in Winterthur, Switzerland. In yet another exemplary embodiment (not shown), the vibration sensing arrangement 308 may be implemented with an optical sensing device, e.g., one or more lasers. Those skilled in the art will appreciate other suitable devices for implementing the vibration sensing arrangement 308.

The system 300 further includes a computer 315. The computer 315 shown in the exemplary embodiment of FIG. 3 includes a central processing unit 316, an input device 318 (e.g., a keyboard), and an output device 320 (e.g., a display). Those skilled in the art appreciate the near limitless variations for types, styles, and configurations of the computer 315. In the exemplary embodiments, the computer 315 is capable of receiving inputs, executing instructions (e.g., a program), performing mathematical computations, and producing an output.

The computer 315 is in communication with the vibration sensing arrangement 308. As such, signals corresponding to the vibrations of the tire 100 sensed by the vibration sensing arrangement 308 are sent from the vibration sensing arrangement 308 to the computer 315, thus allowing the computer 315 to process the signals and the vibration data encoded therein. The computer 315 may also be in communication with the vibration generating device 302. As such, the computer 315 may send signals to the vibration generating device 302 to control operation of the device 302. The computer 315 may also receive signals from the vibration generating device 302 corresponding to the vibrations generated by the device 302.

The computer 315 may include data acquisition hardware (not shown) for receiving signals from the vibration sensing arrangement 308 and/or the vibration generating device 302. Suitable data acquisition hardware may include, but is not limited to, SCADAS Mobile equipment manufactured by LMS International, headquartered in Leuven, Belgium. The computer 315 may execute data processing software. One suitable data processing software is MATLAB, produced by The MathWorks, Inc. headquartered in Natick, Mass.

The method of determining frequencies associated with tire crown bending may be performed utilizing the above described system 300. However, the method may be implemented with other systems, devices, and/or assemblies.

The method includes exciting vibrations through the tire 100. For example, the impact hammer of the vibration generating device 302 may strike the tire 100 to excite vibrations therethrough. In the embodiment shown in FIG. 3, and as described above, the tire 100 is struck at a point 304 generally at the center 304 of the crown 102. The method also includes sensing vibrations at the plurality of points 310, 312 on the tire 100. In the embodiment shown in FIG. 3, and as described above, vibrations are sensed at least at a point 310 generally at the center 304 of the crown 102 and at a point 312 generally at the center 314 of the sidewall 104.

The method further includes determining a first frequency associated with bending of the crown 102. This determination is based, at least partially, on phase differences between the frequency response functions of the sensed vibrations at the plurality of points 310, 312 on the tire 100.

In one exemplary embodiment, the determination of the first frequency associating with the bending of the crown 102 includes comparing the frequency response functions between the vibrations sensed at the plurality of sensing points 310, 312. More specifically, determining the first frequency associating with crown bending includes determining the frequency at which the imaginary part of the frequency response function at the first point 310 is generally out-of-phase with the frequency response function at the second point 312. Said another way, the first frequency associating with bending occurs when the oscillation of the crown 102 of the tire 100 reverses polarity with the oscillation of the sidewall 104. Reversal of polarity is observed by comparing the responses at relatively low frequency (e.g., 100-200 Hz) versus those at the frequency band of interest (e.g., 300-400 Hz). Additional sensing points on the tire 100 may also be utilized to ensure an even more accurate determination of the first frequency associated with bending of the crown 102.

Testing of the tire 100 as described above may be performed under a wide variety of conditions. For instance, the tire 100 may be tested in a "free-free" environment. The free-free environment may be accomplished by suspending the tire 100 with a bungee or other flexible cord. Alternatively, the free-free environment may be achieved by supporting the tire 100 with a flexible surface, e.g., a soft foam pad. Those skilled in the art will appreciate other techniques for providing the free-free environment. The testing of the tire 100 may also be accomplished in a "fixed-free" environment. For example, the tire 100 may be mounted by fastening the wheel to a rigid inertial anchor or spindle. Notably, by testing the tire 100 as described above, a road test of the tire 100 mounted on a vehicle is not necessary. As such, the time and expense of such a road test is avoided.

The method may also include reporting the first frequency associated with bending of the crown 102 of the tire 100. This reporting may be accomplished via the output device 320 of the computer 315 or via other techniques that are well known to those skilled in the art. By reporting the first frequency associated with bending of the crown 102, a user may deduce whether or not the tire 100 will create undesired noise when driven on the vehicle.

Figure 5:
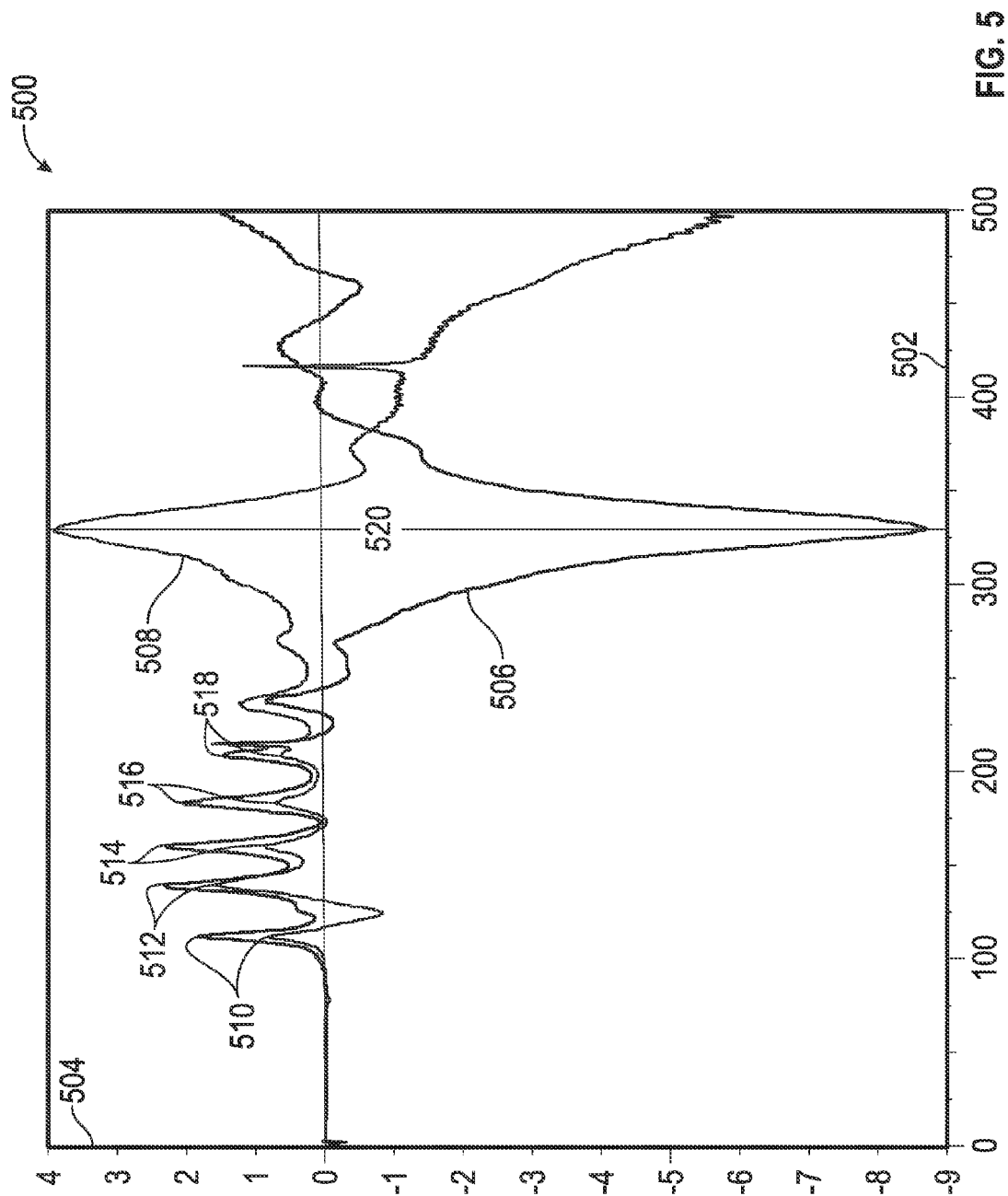
FIG. 5 is a graph showing magnitude and phase difference between oscillations of a sidewall and a crown of the tire.

One potential reporting generated by the computer 320 is shown in FIG. 5. Specifically, FIG. 5 illustrates a graph 500 showing frequency, measured in Hertz (Hz), on the horizontal axis 502. The vertical axis 504 of the graph 500 shows a magnitude of the imaginary part of the frequency response function. These graphs may be interpreted to indicate phase difference between the sensed vibrations at the plurality of points 310, 312. This interpretation is possible by viewing the polarity of the responses across the frequencies and noting the polarities of measurements in the vicinity of 100-200 Hz, peaks at 510, 512, 514, 516, and 518, and comparing these to those measured at 300-400 Hz, namely, peaks 520.

A first curve 508 shows vibrations at the crown 102 of the tire 100. A second curve 506 shows vibrations corresponding at the sidewall 104 of of the tire 100. The phase between the crown 102 and sidewall 104 motions at the local maxima transition from in-phase below approximately 200 Hz to out-of-phase above 300 Hz. In-phase is visible by identical signal polarities, while out-of-phase is visible at opposite polarities. Outward crown 102 motions are positive, while outward sidewall 104 motions are negative. As can be seen, the maximum phase shift, which illustrates the first significant, observable frequency associated with crown bending with m=5 (see FIG. 2), occurs at about 330 Hz. When the first frequency corresponding to crown bending with m=5 occurs below a target value, for instance, 400 Hz, the tire 100 may produce an undesirable noise in the vehicle. Said simply, the tire 100 showing the characteristics shown in FIG. 5 may need to be re-designed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A system for determining frequencies associated with tire crown bending, comprising:
    a vibration generating device configured to excite vibrations through a tire;
    a vibration sensing arrangement configured to sense vibrations at a plurality of sensing points on the tire; and
    a computer in communication with said vibration sensing arrangement and configured to determine a first frequency associated with bending of a crown of the tire based at least partially on phase differences between the sensed vibrations at the plurality of points on the tire.

2. The system as set forth in claim 1 wherein said vibration generating device is further defined as an impact hammer.

3. The system as set forth in claim 1 wherein said vibration sensing arrangement is further defined as a plurality of accelerometers.

4. The system as set forth in claim 1 wherein said computer is in communication with said vibration generating device and is configured to measure frequency response functions between the vibrations excited by the vibration generating device and the vibrations at the plurality of sensing points on the tire.

5. The system as set forth in claim 1 wherein the plurality of sensing points include a first point disposed on the crown of the tire.

6. The system as set forth in claim 5 wherein the first point is disposed generally at a center of the crown of the tire.

7. The system as set forth in claim 5 wherein the plurality of sensing points include a second point disposed on a sidewall of the tire.

8. The system as set forth in claim 7 wherein the second point is disposed generally on a center of the sidewall of the tire.

9. The system as set forth in claim 1 wherein said vibration generating device is further defined as a hammer disposed to strike the tire at a center of the crown.

10. The system as set forth in claim 1 wherein the computer is further configured to report the first frequency associated with bending of the crown.

11. A method of determining frequencies associated with tire crown bending, comprising:
    exciting vibrations through a tire;
    sensing vibrations at a plurality of points on the tire; and
    determining a first frequency associated with bending of a crown of the tire based at least partially on phase differences between the sensed vibrations at the plurality of points on the tire.

12. The method as set forth in claim 11 wherein sensing vibrations at a plurality of points on the tire includes sensing vibrations at a first point disposed on the crown of the tire.

13. The method as set forth in claim 12 wherein the first point is disposed generally at a center of the crown of the tire.

14. The method as set forth in claim 12 wherein sensing vibrations at a plurality of points on the tire includes sensing vibrations at a second point disposed on a sidewall of the tire.

15. The method as set forth in claim 14 wherein the second point is disposed generally on a center of the sidewall of the tire.

16. The method as set forth in claim 14 wherein determining the first frequency associated with bending of the crown comprises measuring frequency response functions between the vibrations excited by the vibration generating device and the vibrations at the plurality of sensing points on the tire.

17. The method as set forth in claim 16 wherein determining a first frequency associated with bending of the crown comprises determining the frequency at which the frequency response function at the first point is generally out-of-phase with the frequency response function at the second point.

18. The method as set forth in claim 11 further comprising reporting the first frequency associated with bending of the crown of the tire.

\* \* \* \* \*